US012605704B2

(12) United States Patent
Laurent et al.

(10) Patent No.: US 12,605,704 B2
(45) Date of Patent: Apr. 21, 2026

(54) APPARATUS AND METHOD FOR CLAMPING A MICROFLUIDIC DEVICE

(71) Applicant: ASTRAVEUS, Le Kremlin-Bicêtre (FR)

(72) Inventors: Jérémie Laurent, Châtenay-Malabry (FR); Nicolas Jamond, Senlisse (FR); Vincent Thisse, Choisy le Roi (FR); Philippe Kergourlay, Paris (FR)

(73) Assignee: ASTRAVEUS, Le Kremlin-Bicêtre (FR)

( * ) Notice: Subject to any disclaimer, the term of this patent is extended or adjusted under 35 U.S.C. 154(b) by 1056 days.

(21) Appl. No.: 17/636,722

(22) PCT Filed: Aug. 28, 2020

(86) PCT No.: PCT/EP2020/074091
§ 371 (c)(1),
(2) Date: Feb. 18, 2022

(87) PCT Pub. No.: WO2021/038049
PCT Pub. Date: Mar. 4, 2021

(65) Prior Publication Data

US 2022/0266247 A1 Aug. 25, 2022

(30) Foreign Application Priority Data

Aug. 29, 2019 (EP) ..................................... 19306048

(51) Int. Cl.
*B01L 3/00* (2006.01)

(52) U.S. Cl.
CPC ... *B01L 3/502715* (2013.01); *B01L 3/502707* (2013.01); *B01L 2200/027* (2013.01);
(Continued)

(58) Field of Classification Search
CPC ......... B01L 3/502715; B01L 3/502707; B01L 2200/027; B01L 2200/0689;
(Continued)

(56) References Cited

U.S. PATENT DOCUMENTS

| | | | |
|---|---|---|---|
| 2008/0000892 A1 | 1/2008 | Hirano et al. | |
| 2009/0305397 A1 | 12/2009 | Dodgson et al. | |

(Continued)

FOREIGN PATENT DOCUMENTS

| | | |
|---|---|---|
| EP | 1400280 A1 | 3/2004 |
| EP | 2682781 B1 | 4/2019 |

(Continued)

OTHER PUBLICATIONS

International Search Report and Written Opinion of the International Searching Authority mailed on Nov. 17, 2020, in corresponding to International Application No. PCT/EP2020/074091; 9 pages.

*Primary Examiner* — Brian J. Sines
(74) *Attorney, Agent, or Firm* — Maier & Maier, PLLC

(57) ABSTRACT

An apparatus suitable for clamping at least one microfluidic device, which includes (i) a fluid-tight chamber having a fluid inlet, the chamber being configured to receive a microfluidic device to be clamped by compression of at least one deformable part of the microfluidic device under the action of a pressure of a clamping fluid in the chamber, and (ii) a perfusion fluid management system configured to adjust the pressure of a perfusion fluid in the microfluidic device in such a way that, during a clamping operation, the pressure of the clamping fluid in the chamber is strictly higher than the pressure of the perfusion fluid in the microfluidic device.

13 Claims, 9 Drawing Sheets

(52) U.S. Cl.
CPC ... *B01L 2200/0689* (2013.01); *B01L 2200/12* (2013.01); *B01L 2200/146* (2013.01); *B01L 2300/0816* (2013.01); *B01L 2300/0887* (2013.01); *B01L 2300/14* (2013.01)

(58) Field of Classification Search
CPC ........... B01L 2200/12; B01L 2200/146; B01L 2300/0816; B01L 2300/0887; B01L 2300/14; B01L 9/527; B01L 3/50273; B01J 2219/00869; B01J 2219/00891; B01J 2219/00988; B01J 19/0093; C12M 23/16; C12M 41/40
See application file for complete search history.

(56) References Cited

U.S. PATENT DOCUMENTS

| | | | |
|---|---|---|---|
| 2011/0044865 | A1 | 2/2011 | Groisman et al. |
| 2014/0038855 | A1 | 2/2014 | Bergh et al. |
| 2014/0100141 | A1 | 4/2014 | Bechstein et al. |
| 2019/0177678 | A1 | 6/2019 | Bigliardi et al. |

FOREIGN PATENT DOCUMENTS

| | | | |
|---|---|---|---|
| EP | 3395436 | B1 | 8/2023 |
| JP | 2004105962 | A | 4/2004 |
| JP | 2009274030 | A | 11/2009 |
| JP | 2010069373 | A | 4/2010 |
| JP | 2014029317 | A | 2/2014 |
| WO | 2017111119 | A1 | 6/2017 |

APPARATUS AND METHOD FOR CLAMPING A MICROFLUIDIC DEVICE

FIELD OF INVENTION

The present invention relates to an apparatus and a method for clamping at least one microfluidic device.

BACKGROUND

In the field of microfluidics, it is known to clamp a microfluidic device using chemical adhesion or mechanical systems, such as rigid plates with bolts, C-clamp, magnets or shafts and levers. Chemical adhesion methods are limited in terms of compatible materials and admissible pressure ranges. Mechanical systems rely on precise and sturdy geometries and adjustments in order to achieve a uniform clamping pressure, and thus a uniform sealing.

It is these drawbacks that the invention is intended more particularly to remedy by proposing an apparatus and a method for clamping at least one microfluidic device making it possible to ensure a uniform clamping force, and thus uniform sealing, on the whole surface of the microfluidic device, with a simple structure of the apparatus, the apparatus and the method of the invention further providing access to the microfluidic device, e.g. for monitoring purpose, and making it possible to clamp several microfluidic devices collectively if desired, possibly with a high density of the microfluidic devices.

SUMMARY

For this purpose, a subject of the invention is an apparatus for clamping at least one microfluidic device, said apparatus comprising:

- a fluid-tight chamber having a fluid inlet, the chamber being configured to receive a microfluidic device to be clamped by compression of at least one deformable part of the microfluidic device under the action of a pressure of a clamping fluid in the chamber,
- a perfusion fluid management system configured to adjust the pressure of a perfusion fluid in the microfluidic device in such a way that, during a clamping operation, the pressure of the clamping fluid in the chamber is strictly higher than the pressure of the perfusion fluid in the microfluidic device.

According to one embodiment, the perfusion fluid management system comprises at least one pressure controller. The use of pressure controllers, rather than volumetric pumps or other flow generators with poor pressure control, ensures that the flow of the perfusion fluid is stable and improves the control of the pressure of the perfusion fluid in each microfluidic device, which is key for the clamping. In particular, an electronic pressure controller, which is a pressure generator controlled with an electronic feedback loop, allows for a better instantaneous control of the pressure of the perfusion fluid.

According to one embodiment, the apparatus comprises a clamping fluid management system configured to adjust the pressure of the clamping fluid in the chamber, and a control unit configured to drive both the clamping fluid management system and the perfusion fluid management system in such a way that, during a clamping operation, the pressure of the clamping fluid in the chamber is strictly higher than the pressure of the perfusion fluid in the microfluidic device. Such an embodiment where a control unit is configured to drive both the clamping fluid management system and the perfusion fluid management system makes it possible to adjust the clamping of the microfluidic device as a function of its perfusion conditions, thus ensuring an efficient clamping in any working condition. The control unit can include several control modules working in cooperation.

Therefore, a specific embodiment of the invention is an apparatus for clamping at least one microfluidic device, said apparatus comprising:

- a fluid-tight chamber having a fluid inlet, the chamber being configured to receive a microfluidic device to be clamped by compression of at least one deformable part of the microfluidic device under the action of a pressure of a clamping fluid in the chamber,
- a perfusion fluid management system configured to adjust the pressure of a perfusion fluid in the microfluidic device in such a way that, during a clamping operation, the pressure of the clamping fluid in the chamber is strictly higher than the pressure of the perfusion fluid in the microfluidic device, wherein the perfusion fluid management system (8) comprises at least one pressure controller,
- a clamping fluid management system configured to adjust the pressure of the clamping fluid in the chamber, the clamping fluid management system comprising a pressure source connected to the fluid inlet of the chamber via a duct, and
- a control unit configured to drive both the clamping fluid management system and the perfusion fluid management system in such a way that, during a clamping operation, the pressure of the clamping fluid in the chamber is strictly higher than the pressure of the perfusion fluid in the microfluidic device.

Within the frame of the invention, a microfluidic device may be a single microfluidic chip or a stack of microfluidic chips. A microfluidic chip typically comprises inner channels having a cross section area equal to or less than 0.5 $mm^2$. A microfluidic chip may be monolithic, the channels being formed in the material constituting the chip. As a variant, a microfluidic chip may comprise a back plate and a cover plate defining channels therebetween. In this case, each one of the back plate and the cover plate may be a rigid plate, e.g. made of glass or a rigid polymer such as polycarbonate, poly (methyl methacrylate) (PMMA) or cyclic olefin copolymer (COC), or may be an elastomeric plate, e.g. made of silicone. When both the back plate and the cover plate of a microfluidic chip are rigid plates, the microfluidic chip may comprise an elastomeric seal between the back plate and the cover plate, e.g. made of polydimethylsiloxane.

In any of the above-described configurations, the microfluidic chip may undergo a deformation due to a pressure difference between the interior of a channel and the exterior. In the case of a monolithic microfluidic chip, an overpressure in a channel may cause an increase in the volume of the channel and a deformation of the material constituting the chip, susceptible to lead to a rupture of the material and the appearance of cracks or passages likely to generate leaks. In the case of a microfluidic chip including several parts, which may be rigid parts and/or elastomeric parts, an overpressure in a channel may cause a deformation of constitutive parts of the microfluidic chip and a relative displacement thereof, here again susceptible to lead to the appearance of passages likely to generate leaks. In any of these cases, the microfluidic chip can be clamped, i.e. the channels of the microfluidic chip can be closed, by compression under the action of the pressure of the clamping fluid in the chamber of the at least one deformable part which is deformed under the effect of an overpressure in a channel, which is the material constituting the chip in the case of a monolithic microfluidic chip, or at least one rigid or elastomeric constitutive part of the chip in the case of a chip in several pieces.

Within the frame of the invention, the clamping fluid, which is received in the chamber, may be a gas, a liquid, or a combination thereof. The perfusion fluid, which is circulated in the microfluidic device, may be a gas, a liquid, a gelled or semi-gelled fluid, or a combination thereof. Examples of perfusion fluids include, e.g., a gas mixture, an aqueous particle or cell suspension, a non-aqueous particle suspension, a multiphasic liquid, an aqueous or non-aqueous solution, a gelled or semi-gelled particle or cell suspension. Several perfusion fluids may be circulated in the microfluidic device, in which case multiple perfusion lines may advantageously be used to handle the circulation of the different perfusion fluids independently from one another.

An apparatus according to the invention makes it possible to perform a clamping of the or each microfluidic device received in the chamber, under the action of the pressure of the clamping fluid in the chamber, through uniform and omnidirectional compression of the at least one deformable part of the microfluidic device, thus ensuring optimal clamping homogeneity. It is thus possible to prevent leaks or breakage in the microfluidic device, even for high working perfusion pressures or in the presence of pressure differences or pressure gradients in the channels of the microfluidic device.

Very advantageously, an apparatus according to the invention also makes it possible to perform a clamping of a plurality of microfluidic devices collectively in one and the same chamber. The net clamping force applied on each microfluidic device present in the chamber, i.e. resulting from the pressure difference between the pressure of the clamping fluid in the chamber and the pressure of the perfusion fluid in the microfluidic device, can be controlled easily. In the case of a microfluidic device comprising an elastomeric back plate and/or an elastomeric cover plate, the clamping pressure is also advantageous in that it may reduce the pressure difference between the inside and the outside of the microfluidic device when in use, thus reducing the deformation of the elastomeric material and limiting variations in the volume of the channels of the microfluidic device.

According to one embodiment, the difference between the pressure of the clamping fluid in the chamber and the pressure of the perfusion fluid in the microfluidic device is kept equal to or higher than 0.05 bar, preferably equal to or higher than 0.1 bar. Such a minimal pressure difference ensures that the deformable part(s) of the microfluidic device are sufficiently compressed to guarantee the sealing of the microfluidic device in conventional working conditions. Additionally, such a pressure difference ensures that, in case of leaks, no flow can come out of the microfluidic device, which is advantageous in particular when the perfusion fluid contains hazardous materials.

According to one embodiment, a control unit is configured to receive measurements of the pressure of the clamping fluid in the chamber and measurements of the pressure of the perfusion fluid in the microfluidic device from pressure sensors, and to drive the clamping fluid management system, and possibly also the perfusion fluid management system, as a function of the received measurements. In this way, relative adjustments of the pressure of the perfusion fluid in the microfluidic device and the pressure of the clamping fluid in the chamber can be performed so as to seal the microfluidic device optimally. In one embodiment, the pressure of the clamping fluid in the chamber can be kept at a fixed value, whereas a continuous adjustment of the pressure of the perfusion fluid in the microfluidic device can be performed so as to seal the microfluidic device optimally. In another embodiment, a continuous adjustment of the pressure of the clamping fluid in the chamber can be performed as a function of the pressure of the perfusion fluid in the microfluidic device so as to seal the microfluidic device optimally.

According to one embodiment, the chamber is configured to receive in its internal volume a plurality of microfluidic devices to be clamped collectively under the action of the pressure of the clamping fluid in the chamber. In this way, an apparatus according to the invention makes it possible to clamp simultaneously a plurality of microfluidic devices, provided that the pressure of the clamping fluid in the chamber is strictly higher than the pressure of the perfusion fluid in each of the microfluidic devices.

According to one embodiment, the apparatus comprises at least one active system configured to monitor the content of a microfluidic device received in the chamber and/or to apply a solicitation to the content of a microfluidic device received in the chamber during a clamping operation, through at least one wall of the microfluidic device.

According to one embodiment, the active system is an optical monitoring system configured to monitor the content of a microfluidic device received in the chamber, through at least one wall of the microfluidic device, during a clamping operation, such as: an imaging system, e.g. a transmitted light imaging system, a reflected light imaging system, a phase imaging system, a fluorescence imaging system, etc.; a spectroscopy system, e.g. a FTIR, a UV spectroscopy system, a visible light spectroscopy system, etc.;

an interferometry system. The monitoring system may also be a temperature monitoring system, a calorimetric measurement system, an electromagnetic impedance measurement system, or any other monitoring or measurement system requiring access to the vicinity of the channels of the microfluidic device.

According to one embodiment, the active system is a lithography system configured to perform lithography within channels of a microfluidic device received in the chamber, through at least one wall of the microfluidic device, during a clamping operation. The lithography system may be any type of lithography system requiring access to the vicinity of the channels of the microfluidic device, such as: a visible light lithography system, a UV lithography system, an EUV lithography system, an X-Ray lithography system, an Electron-beam lithography system, a Femtosecond lithography system, a dynamic mask (e.g. Digital Mirror Device (DMD) or liquid crystal dynamic mask) lithography system, a dynamic source (e.g. LED or LASER array) lithography system, or any of their combinations.

The clamping apparatus of the invention, through the possible use of a lithography system inside the chamber close to the channels of the microfluidic device during a clamping operation, makes it possible to perform lithography operations within the microfluidic device. Performing lithography in perfusable microfluidic devices provides several advantages and capabilities, in particular the possibility to perform in-flow or stop-flow polymerization, allowing micro-particles of well-controlled characteristics to be generated at high throughput, or else the possibility to inject different prepolymer mixtures, resins, developers, pigments, inhibitors, activators, or other types of reactants, thus enriching the manufacturing capabilities using lithography.

According to other embodiments, the active system may be, for example: an electric field generation system, used for example for electroporation of cells in the microfluidic device; an acoustic field generation system, used for example to perform acoustophoresis within the microfluidic devices; a magnetic field generation system, used for example to perform sorting of magnetic particles in the microfluidic device; an illumination system, used for example to perform photochemistry in the microfluidic device; a temperature control system, used for example to locally heat or cool parts of the microfluidic device to perform chemical reactions such as PCR. Here again, the access to the whole periphery of the microfluidic device is of great advantage.

The possible use of active systems close to the channels of the microfluidic device during a clamping operation is a great advantage of the clamping apparatus of the invention, in particular over mechanical clamping systems of the prior art such as rigid plates with bolts, C-clamp, magnets or shafts and levers, which limit or hinder access to the periphery of the microfluidic device. On the contrary, with the clamping apparatus according to the invention, access to the microfluidic device is provided on the whole periphery thereof during a clamping operation, so that an active system, which may be a monitoring system or any other type of active system, can be used as close as possible to the channels of the microfluidic device.

According to one embodiment, the apparatus comprises an imaging system configured to image the content of a microfluidic device received in the chamber, through at least one wall of the microfluidic device. Advantageously, at least one wall of the microfluidic device is transparent in the wavelength range useful for the imaging system, so as to allow imaging of the internal volume of the microfluidic device by means of a conventional camera or another appropriate optical detector.

According to one embodiment, the apparatus comprises a monitoring system configured to monitor the content of a microfluidic device received in the chamber during a clamping operation, and a control module is configured to drive the perfusion fluid management system as a function of measurements of the monitoring system. In this way, the apparatus makes it possible to monitor the working conditions in the microfluidic device and regulate the pressure of the perfusion fluid in the microfluidic device accordingly.

According to one embodiment, the apparatus comprises a displacement system for displacing the active system and a microfluidic device received in the chamber relative to one another, so as to position the active system in the vicinity of channels of the microfluidic device during a clamping operation. The active system may be, e.g., a monitoring system, a lithography system or any other active system for applying a specific solicitation. According to one embodiment, the displacement system is configured to move the active system and the microfluidic device relative one to another to position them in at least one working configuration.

According to one embodiment, the chamber comprises a loading opening for loading the microfluidic device in and out of the chamber, the loading opening being fluid-tightly closed during a clamping operation. In one embodiment, a sleeve for the fluid-tight passage of at least one tube connecting the microfluidic device with the perfusion fluid management system is positioned in an opening made in the sealing surface of a door intended to close the loading opening.

According to one embodiment, the chamber is configured to receive the entirety of the perfusion fluid management system in its internal volume. In this case, the tube(s) connecting the microfluidic device with the perfusion fluid management system are configured to withstand the pressure of the clamping fluid in the chamber substantially without deformation, so as not to impact the circulation of fluid between the perfusion fluid management system and the microfluidic device.

According to another embodiment, the chamber is configured to receive only part of the perfusion fluid management system in its internal volume, the apparatus comprising at least one sleeve configured to be positioned in an opening of a wall of the chamber during a clamping operation so as to allow fluid-tight passage of at least one tube connecting the microfluidic device with the perfusion fluid management system.

According to one embodiment, the sleeve comprises at least one hole configured to receive a tube connecting the microfluidic device with the perfusion fluid management system, the hole extending between an inner end of the sleeve intended to be directed toward the inner volume of the chamber and an outer end of the sleeve intended to be directed toward the exterior of the chamber, the hole being fluid-tightly closed around the tube. In one embodiment, the sleeve is overmolded on the tube. In another embodiment, the sleeve is openable through a reversible deformation so as to give access to the hole in the open configuration of the sleeve, whereas the hole is fluid-tightly closed around the tube when the sleeve is closed and positioned in the opening of the wall of the chamber.

According to one embodiment, the sleeve is a sealing member configured to seal the loading opening of the chamber in a fluid-tight manner, in particular by being placed at the junction between an edge of the loading opening and a door intended to close the loading opening.

According to one embodiment, the chamber is configured to receive only part of the perfusion fluid management system in its internal volume, the apparatus comprising a connecting unit in a wall of the chamber, including at least one fluid passage extending through the wall of the chamber and connectors at both ends of the fluid passage for connection, on the side directed toward the inner volume of the chamber, of a tube connected to the microfluidic device and, on the side directed toward the exterior of the chamber, of a tube connected to the perfusion fluid management system.

According to one embodiment, the apparatus comprises at least one support in the chamber configured to receive a microfluidic device to be clamped. In one embodiment, the apparatus comprises a plurality of supports juxtaposed and/or superposed in the chamber, e.g. in the form of shelves, slots, rails, posts, racks, suction cups, hooks, tweezers, or magnets, configured to receive a plurality of microfluidic devices. In an advantageous embodiment, the or each support is attached to an openable wall of the chamber, in particular to a door configured to close the loading opening of the chamber. In another advantageous embodiment, the or each support is attached to a frame structure configured to be loaded in the chamber by means of rails, wheels or other guiding means, which may be automated.

Another subject of the invention is a method for clamping at least one microfluidic device comprising at least one deformable part, said method comprising steps in which:

- the microfluidic device is connected to a perfusion fluid management system and positioned in a chamber having a fluid inlet;

the chamber is sealed so as to be fluid-tight to a clamping fluid;

the chamber is pressurized with the clamping fluid fed through the fluid inlet; and the microfluidic device is clamped by compression of the at least one deformable part of the microfluidic device under the action of a pressure of the clamping fluid in the chamber, by applying a pressure of the clamping fluid and a pressure of the perfusion fluid so that the pressure of the clamping fluid in the chamber is strictly higher than the pressure of the perfusion fluid in the microfluidic device.

According to one embodiment, the pressure of the perfusion fluid in the microfluidic device is controlled by a control module configured to receive measurements from a monitoring system monitoring the content of the microfluidic device during a clamping operation and to drive the perfusion fluid management system as a function of the received measurements.

According to one embodiment, a plurality of microfluidic devices are positioned inside the chamber and clamped collectively under the action of the pressure of the clamping fluid in the chamber, by applying a pressure of the clamping fluid and a pressure of the perfusion fluid so that the pressure of the clamping fluid in the chamber is strictly higher than the pressure of the perfusion fluid in each of the microfluidic devices.

According to one embodiment, prior to its introduction in the chamber of the apparatus, the or each microfluidic device is "pre-clamped" in such a way that its constitutive elements are assembled in a state where the internal volumes of the microfluidic device are sealed, avoiding that the clamping fluid penetrates inside the microfluidic device during the pressurization of the chamber with the clamping fluid, which would have a deleterious effect on the clamping. Such a "pre-clamping" of the or each microfluidic device may be obtained, e.g., by means of glue inserted between the constitutive elements of the microfluidic device; by means of an adhesive tape covering at least part of the edges of the microfluidic device; or by any other appropriate assembly method.

BRIEF DESCRIPTION OF THE DRAWINGS

Features and advantages of the invention will become apparent from the following description of embodiments of an apparatus and a method according to the invention, this description being given merely by way of example and with reference to the appended drawings in which.

Figure 1:
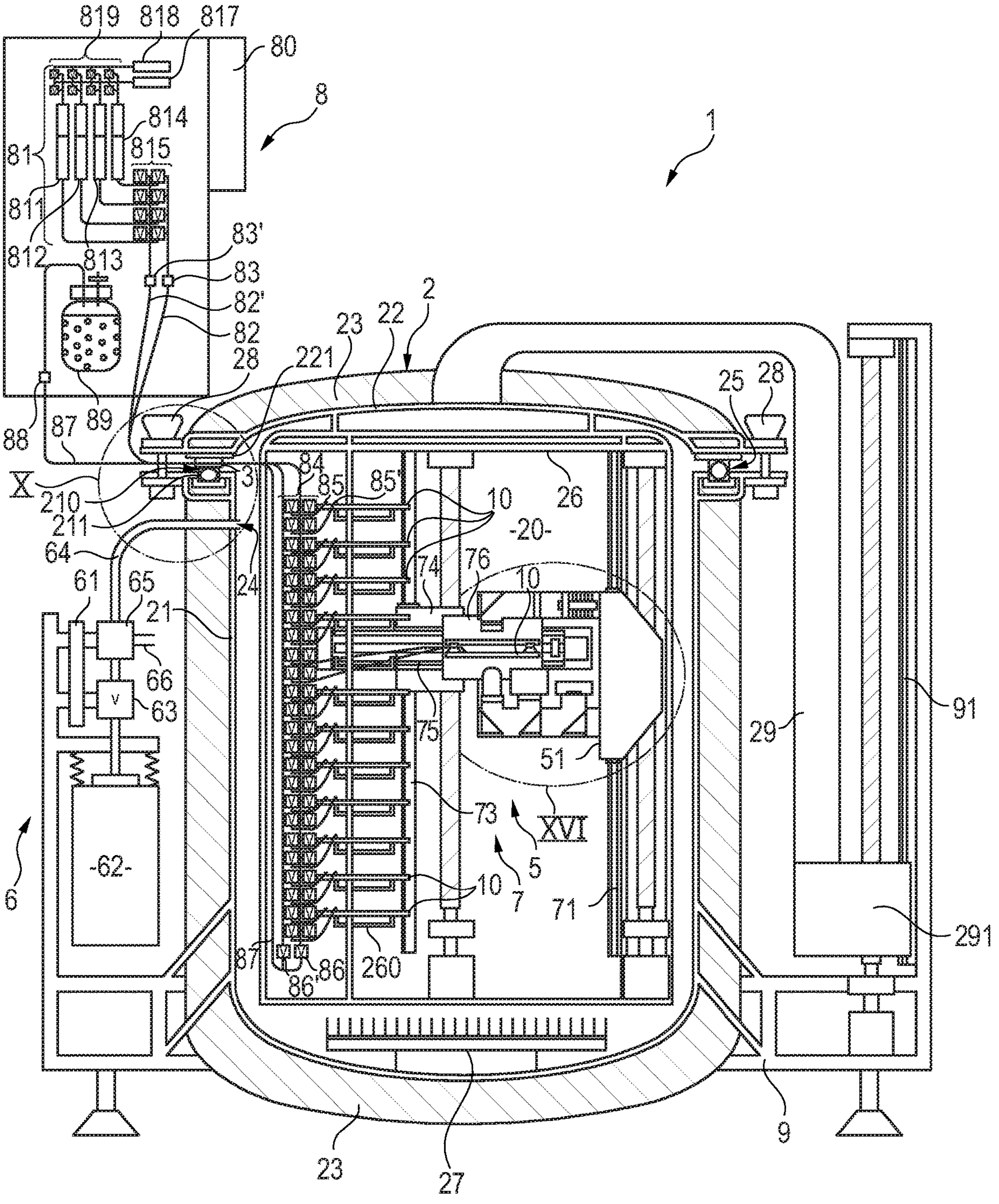
FIG. 1 is a schematic cross section of an apparatus for clamping at least one microfluidic device according to a first embodiment of the invention, in a closed configuration of the fluid-tight chamber.
Figure 5:
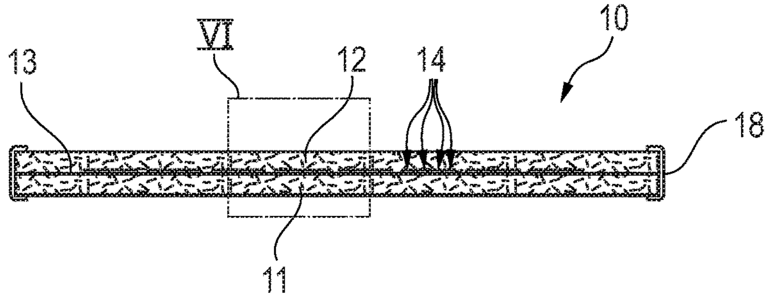
FIG. 5 is a cross section according to the plane V of FIG. 4.
Figure 6A:
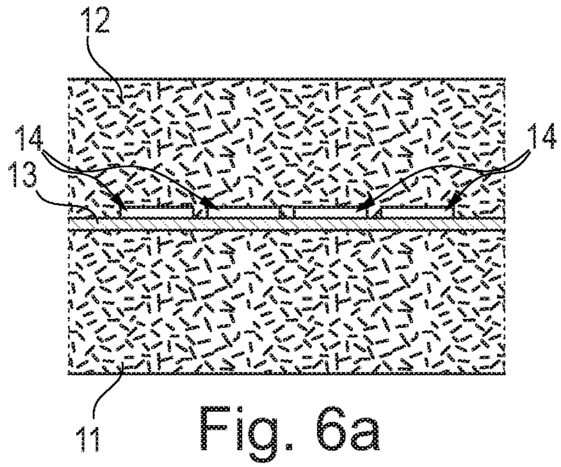
Figure 6B:
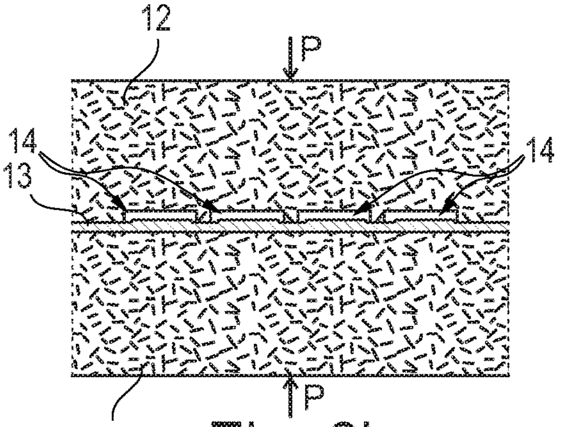
Figure 7A:
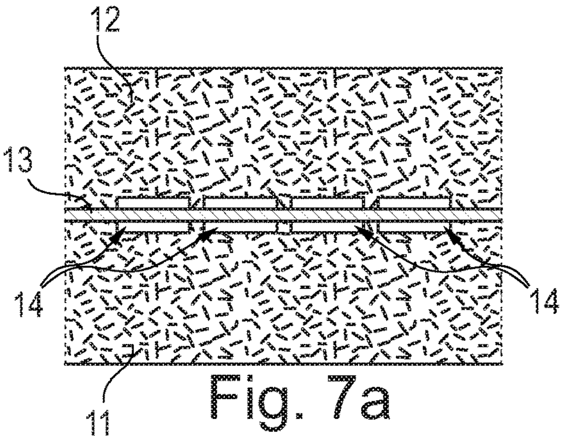
Figure 7B:
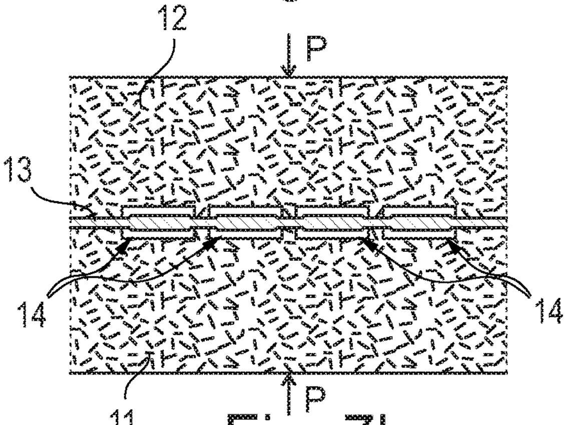
Figure 10:
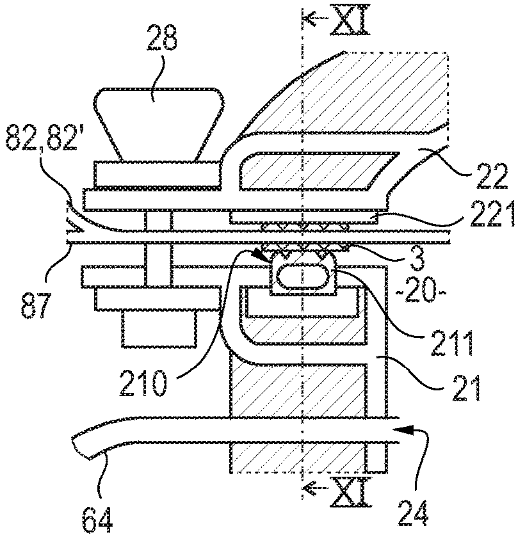
Figure 11:
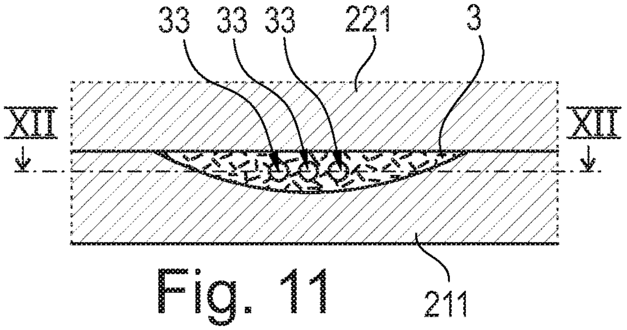
Figure 12:
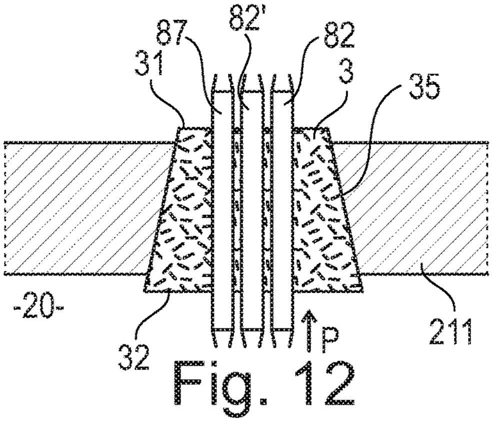
Figure 13:
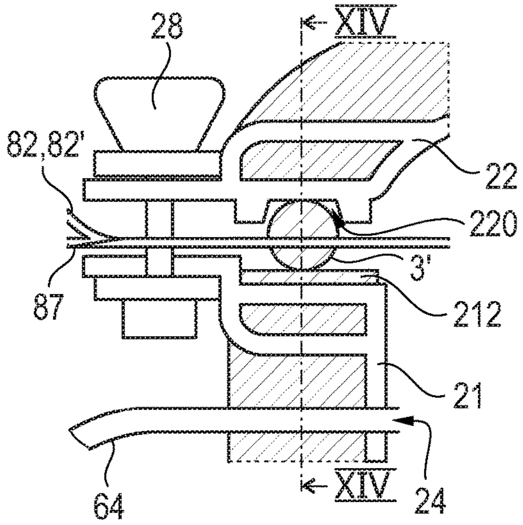
Figure 14:
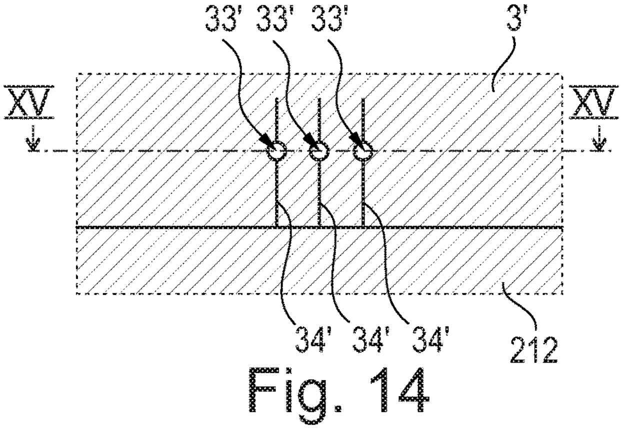
Figure 15:
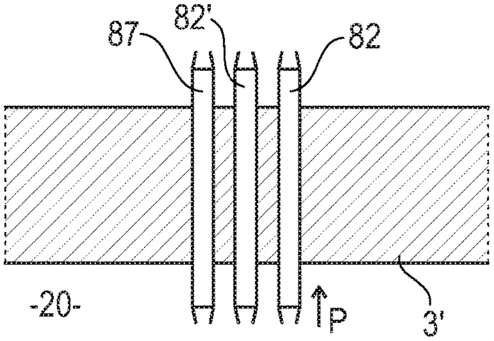
Figure 16:
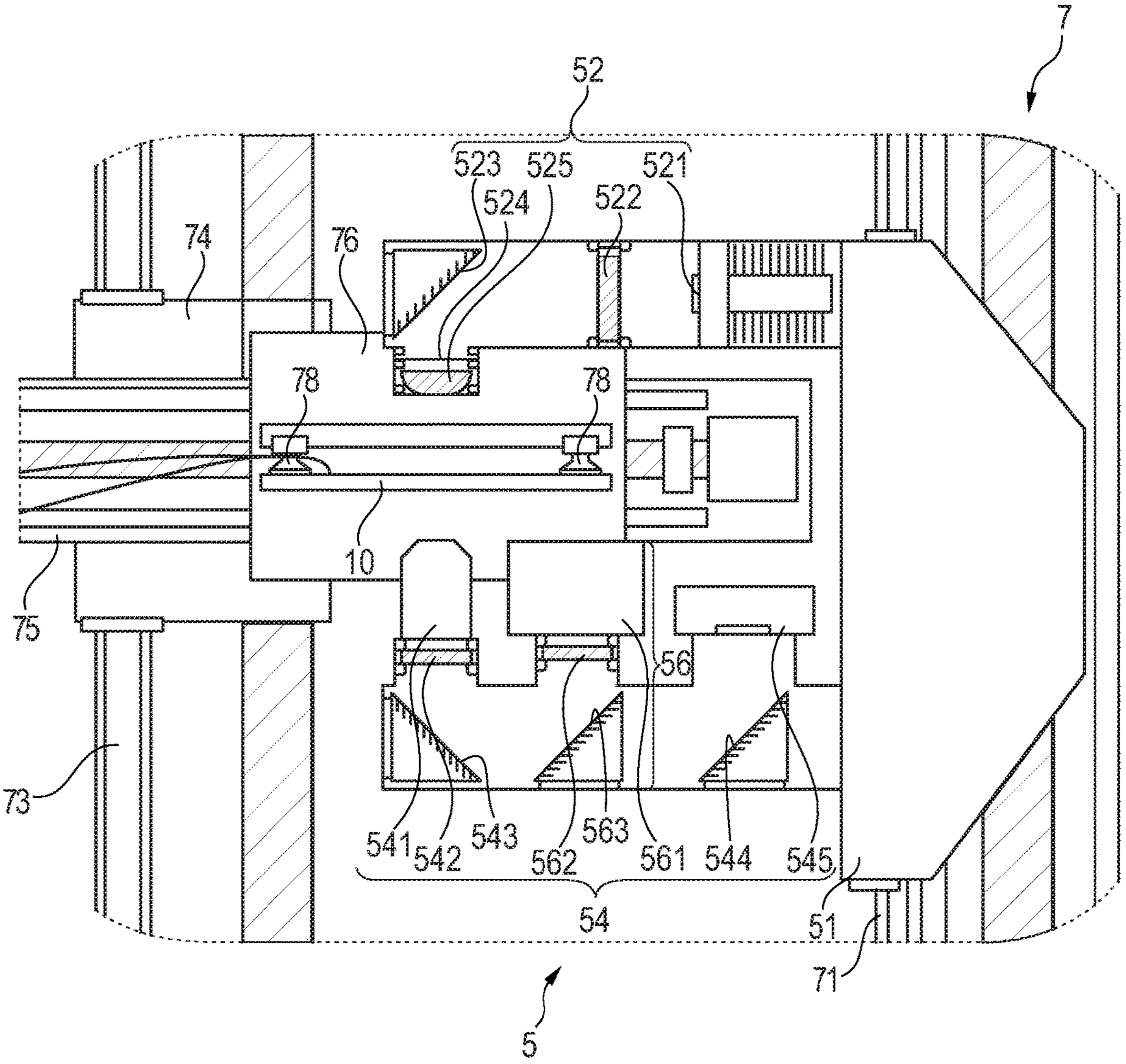
Figure 17:
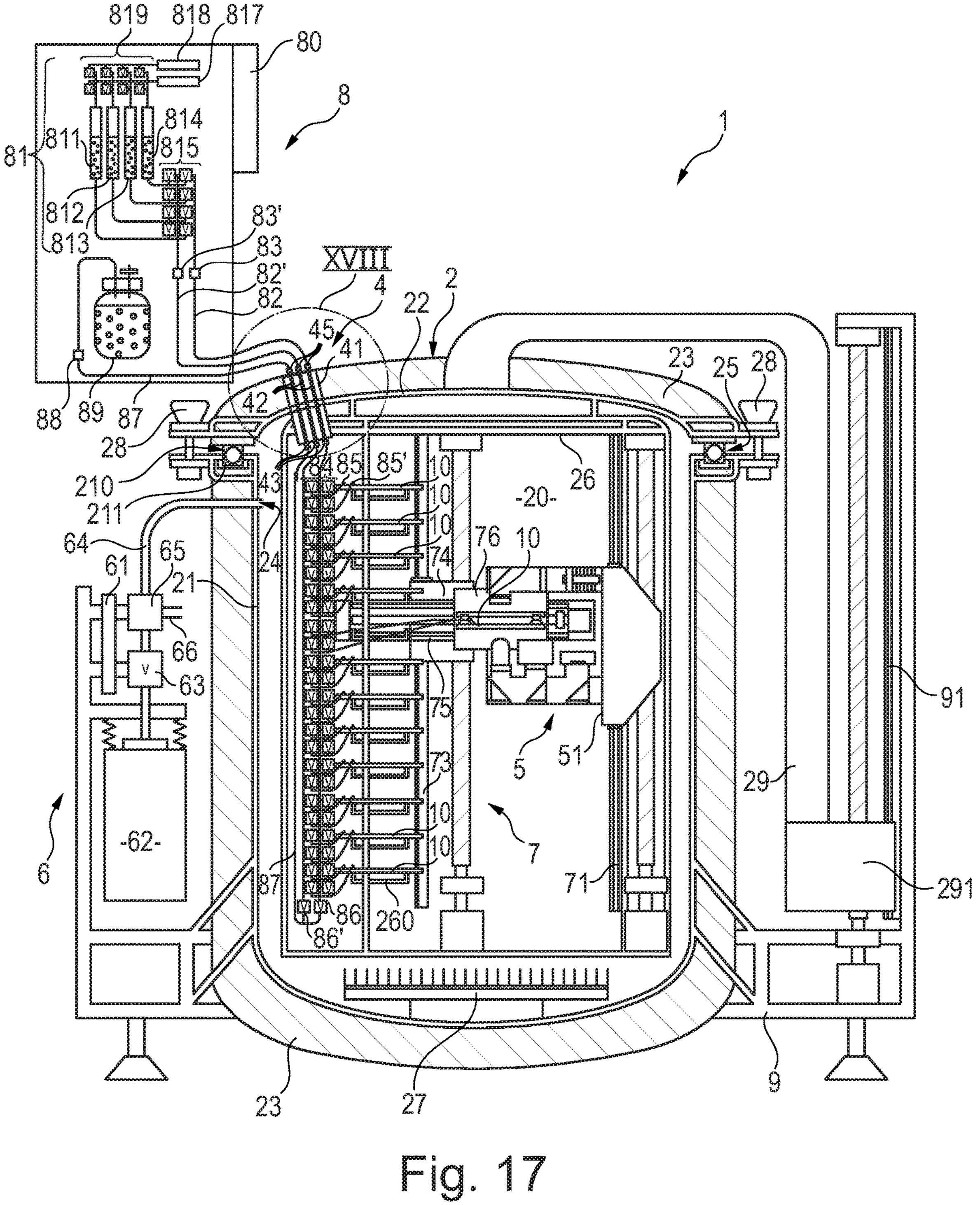
Figure 18:
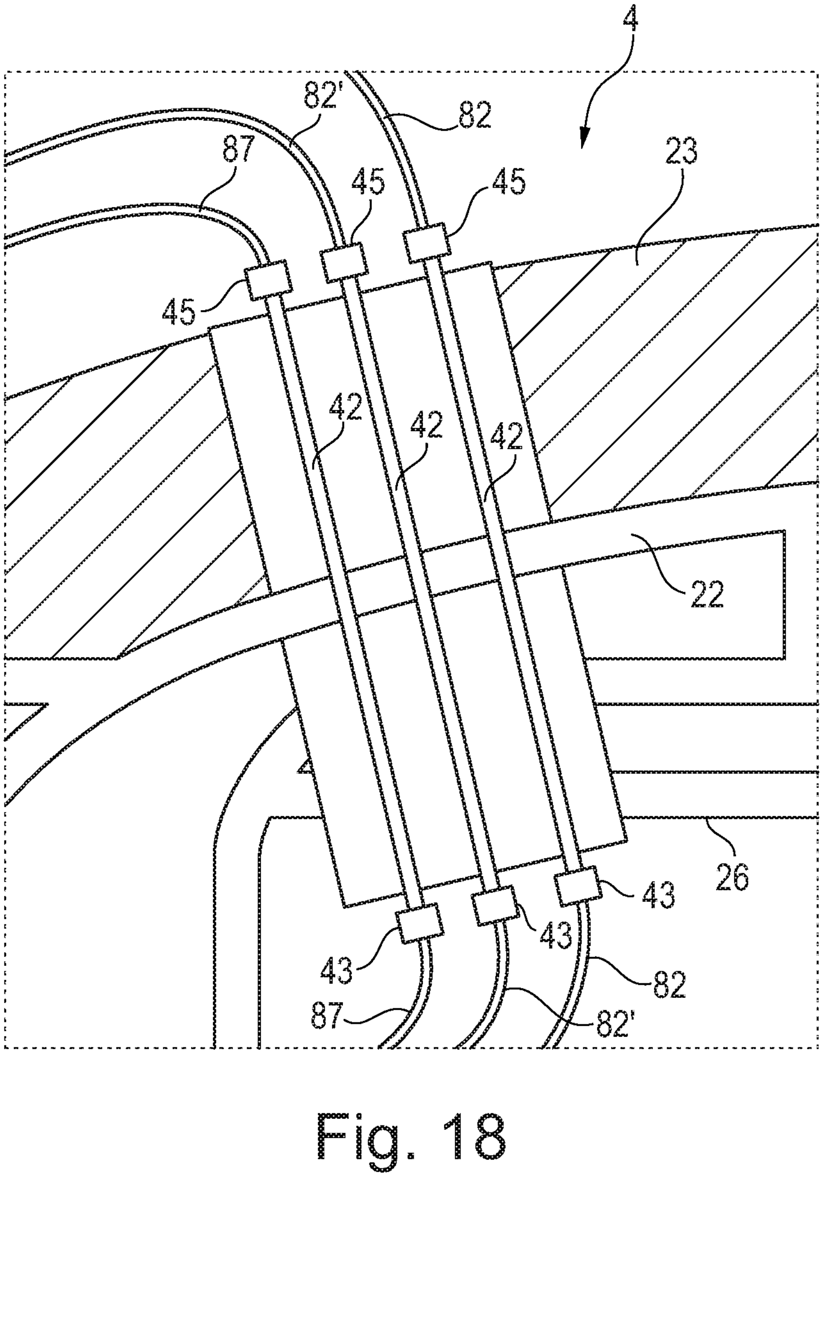

FIG. *6a* is a view at larger scale of the detail VI of FIG. 5;

FIG. *6b* is a view similar to FIG. *6a*, in a clamped configuration of the microfluidic device, in which the elastomeric seal of the microfluidic device is deformed elastically under the action of the pressure of the clamping fluid in the fluid-tight chamber, the deformation of the elastomeric seal having been exaggerated for illustrative purpose;

FIG. *7a* is a view similar to FIG. *6a*, for a first variant of a microfluidic device to be clamped with the apparatus of FIG. 1, in which the channels of the microfluidic device are defined by both the back plate and the cover plate, thus creating a two-stage microfluidic circuit;

FIG. *7b* is a view similar to FIG. *7a*, in a clamped configuration of the microfluidic device, in which the elastomeric seal is deformed elastically under the action of the pressure of the clamping fluid in the fluid-tight chamber, the deformation of the elastomeric seal having been exaggerated for illustrative purpose;

FIG. *8a* is a view similar to FIG. *6a*, for a second variant of a microfluidic device to be clamped with the apparatus of FIG. 1, in which the elastomeric seal is cut according to a pattern aligned with channels of the back plate and the cover plate of the microfluidic device;

FIG. *8b* is a view similar to FIG. *8a*, in a clamped configuration of the microfluidic device, in which the elastomeric seal is deformed elastically under the action of the pressure of the clamping fluid in the fluid-tight chamber, the deformation of the elastomeric seal having been exaggerated for illustrative purpose;

FIG. *9a* is a view similar to FIG. *6a*, for a third variant of a microfluidic device to be clamped with the apparatus of FIG. 1, in which the microfluidic device is monolithic, the microfluidic device being illustrated in a deformed state resulting from an overpressure of a perfusion fluid in a channel of the microfluidic device which is not counteracted by a clamping pressure, the deformation of the material constituting the microfluidic device having been exaggerated for illustrative purpose;

FIG. *9b* is a view similar to FIG. *9a*, in a clamped configuration of the microfluidic device, in which the constitutive material of the microfluidic device is deformed back to a planar configuration under the action of the pressure of the clamping fluid in the fluid-tight chamber;

FIG. 10 is a view at larger scale of the detail X of FIG. 1;

FIG. 11 is a cross section along the line XI of FIG. 10;

FIG. 12 is a cross section along the line XII of FIG. 11;

FIG. 13 is a view similar to FIG. 10, for a variant of the sealing member allowing fluid-tight passage of tubes connecting a perfusion fluid management system with microfluidic devices to be clamped in the fluid-tight chamber of the apparatus;

FIG. 14 is a cross section along the line XIV of FIG. 13;

FIG. 15 is a cross section along the line XV of FIG. 14;

FIG. 16 is a view at larger scale of the detail XVI of FIG. 1;

FIG. 17 is a schematic cross section of an apparatus for clamping at least one microfluidic device according to a second embodiment of the invention, in a closed configuration of the fluid-tight chamber;

FIG. 18 is a view at larger scale of the detail XVIII of FIG. 17; and

Figure 19:
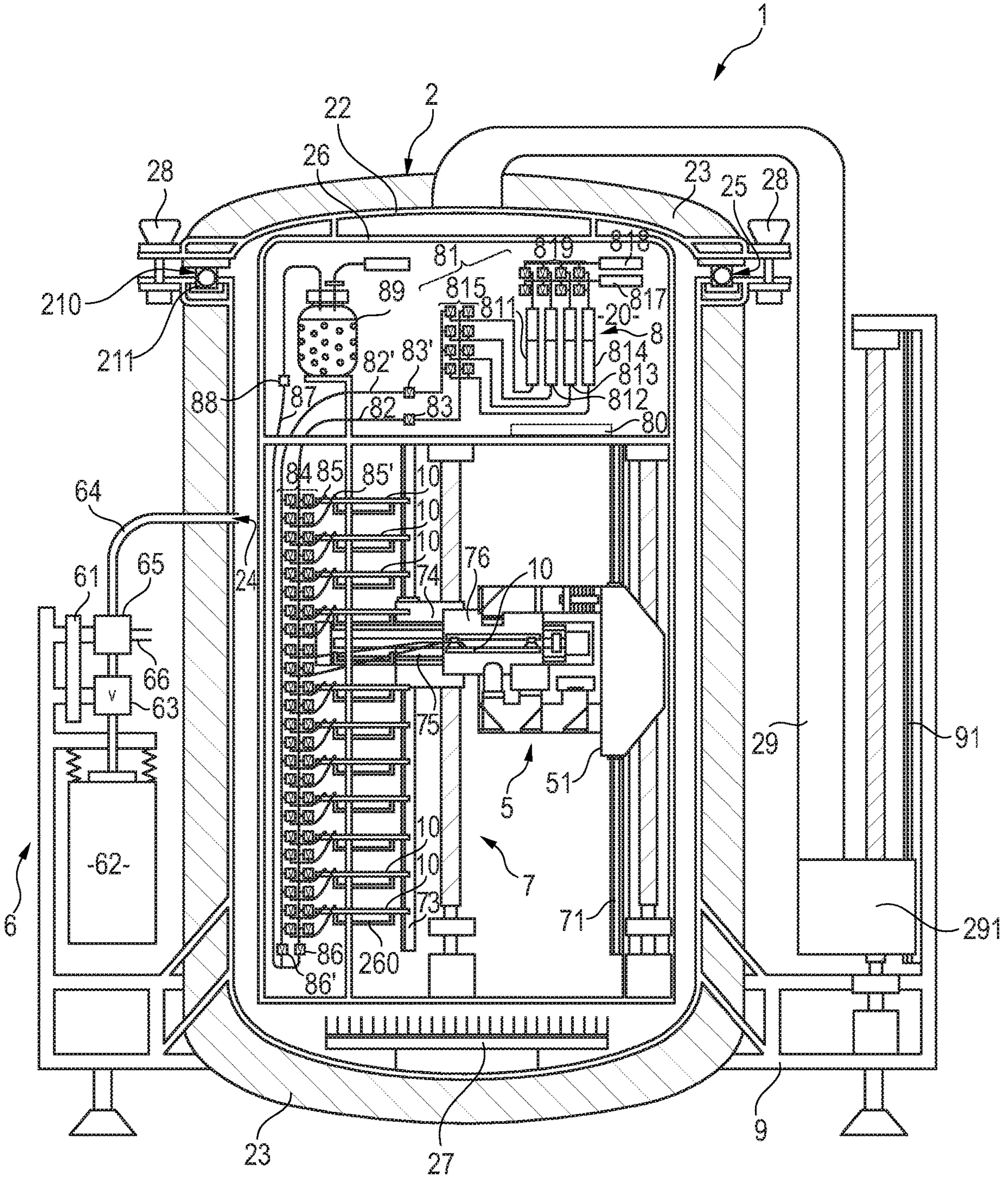

FIG. 19 is a schematic cross section of an apparatus for clamping at least one microfluidic device according to a third embodiment of the invention, in a closed configuration of the fluid-tight chamber.

ILLUSTRATIVE EMBODIMENTS OF THE INVENTION DETAILED DESCRIPTION

Figure 3:
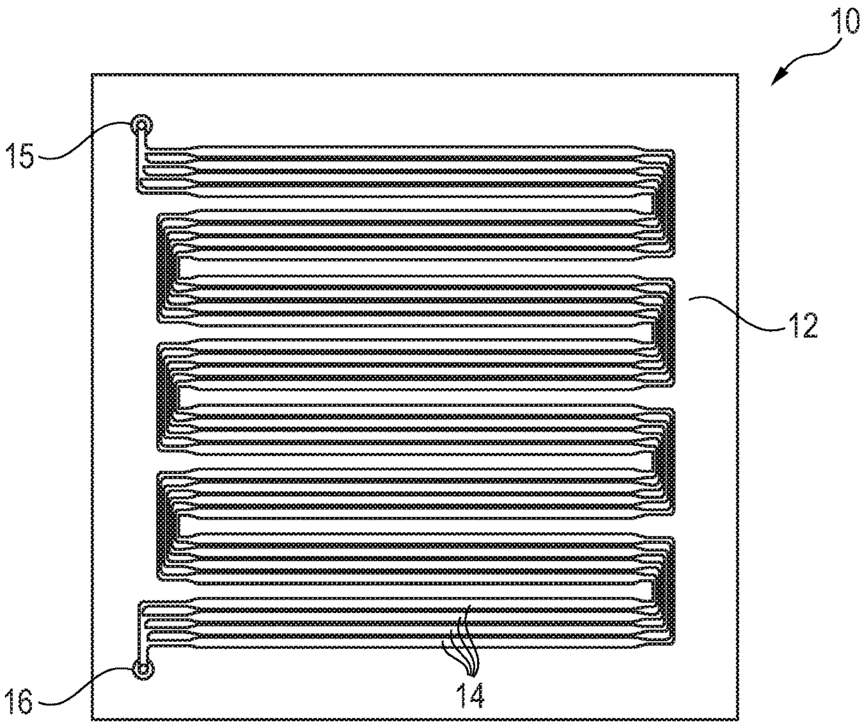
FIG. 3 is a top view of a non-limitative example of a microfluidic device to be clamped with the apparatus of FIG. 1, comprising a rigid back plate, a rigid cover plate and an elastomeric seal between the back plate and the cover plate, the channels of the microfluidic device being defined by the cover plate only.
Figure 4:
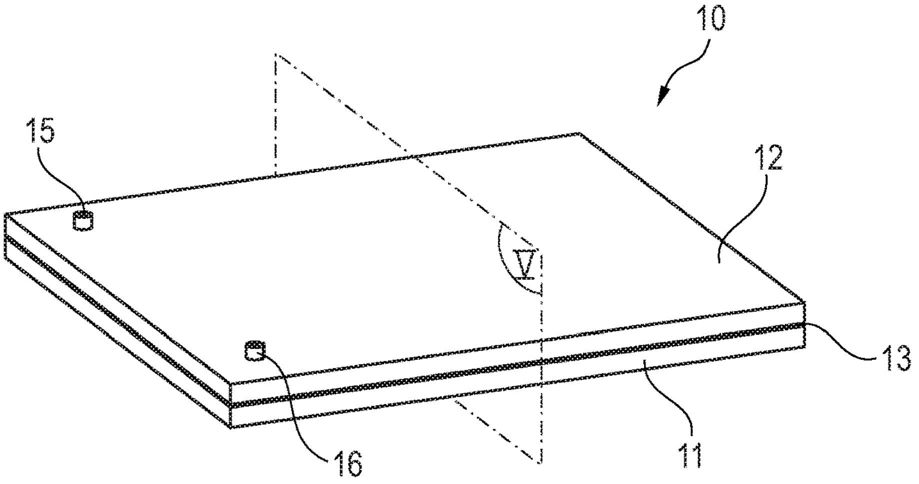
FIG. 4 is a perspective view of the microfluidic device of FIG. 3, the channels of the microfluidic device having been omitted.

FIG. 1 shows an apparatus 1 according to a first embodiment of the invention, intended for the clamping of a plurality microfluidic devices 10 being placed in a chamber 20 of the apparatus 1. In the non-limitative example illustrated in the figures, each microfluidic device 10 is a microfluidic chip comprising a back plate 11 and a cover plate 12 both made of poly(methyl methacrylate) (PMMA), and an elastomeric seal 13 made of polydimethylsiloxane inserted between the back plate 11 and the cover plate 12. As visible in FIGS. 3 to 5, the back plate 11 and the cover plate 12 define therebetween a plurality of channels 14 having a serpentine shaped track, in order to minimize the area of the microfluidic device 10 while maintaining high length of the channels 14. Each microfluidic device 10 includes an inlet port 15 and an outlet port 16 at the two ends of the serpentine shaped track, which are configured to be connected with a pair of feeding lines 85, 85' so as to circulate a perfusion fluid in the channels 14.

Prior to its introduction in the chamber 20 of the apparatus 1, each microfluidic device 10 is advantageously "pre-clamped" with an adhesive tape 18, visible in FIG. 5, which covers at least part of the edges of the microfluidic device 10. In this way, the constitutive elements of the microfluidic device 10 are assembled in a state where the internal volumes of the microfluidic device 10 are sealed, avoiding that the clamping fluid penetrates inside the microfluidic device 10 during the pressurization of the chamber 20, which would have a deleterious effect on the clamping.

Figure 8A:
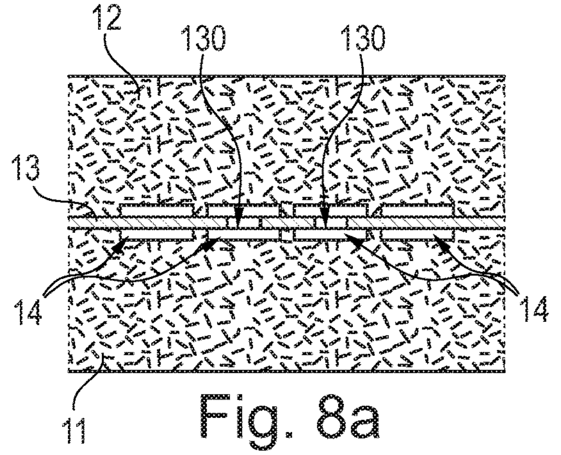
Figure 8B:
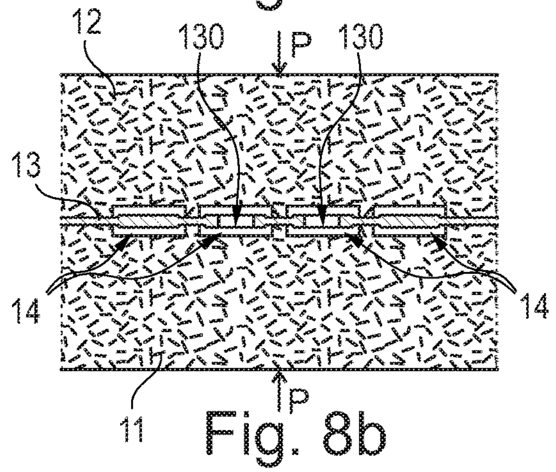
Figure 9A:
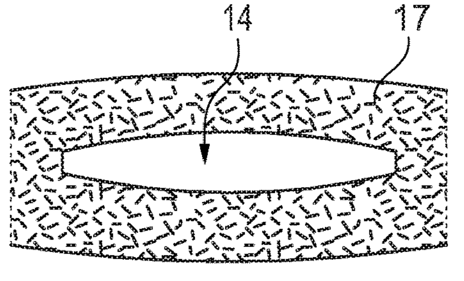

As illustrated in a non-limitative way in FIGS. 6*a*, 7*a*, 8*a*, 9*a*, the channels 14 of the microfluidic device 10 may exhibit different profiles. In a first example shown in FIG. 6*a*, only the cover plate 12 of the microfluidic device 10 is provided with cavities, each channel 14 being formed between the elastomeric seal 13 which covers the back plate 11 and a cavity of the cover plate 12, thus creating a one-stage microfluidic circuit. In the first variant shown in FIG. 7*a*, each channel 14 is formed between two complementary cavities respectively provided in the back plate 11 and the cover plate 12, and the elastomeric seal 13 divides the channel 14 into two superposed compartments. In this first variant, a two-stage microfluidic circuit is thus created. FIG. 8*a* illustrates a second variant of the microfluidic device 10 similar to the first variant of FIG. 7*a*, except that mutual communication is provided between the lower and upper stages of the microfluidic circuit, thanks to perforations 130 of the elastomeric seal 13 corresponding to the channels 14. FIG. 9*a* illustrates a third variant of the microfluidic device 10, in which the microfluidic device is monolithic and the channels 14 are formed in the material constituting the chip.

Figure 2:
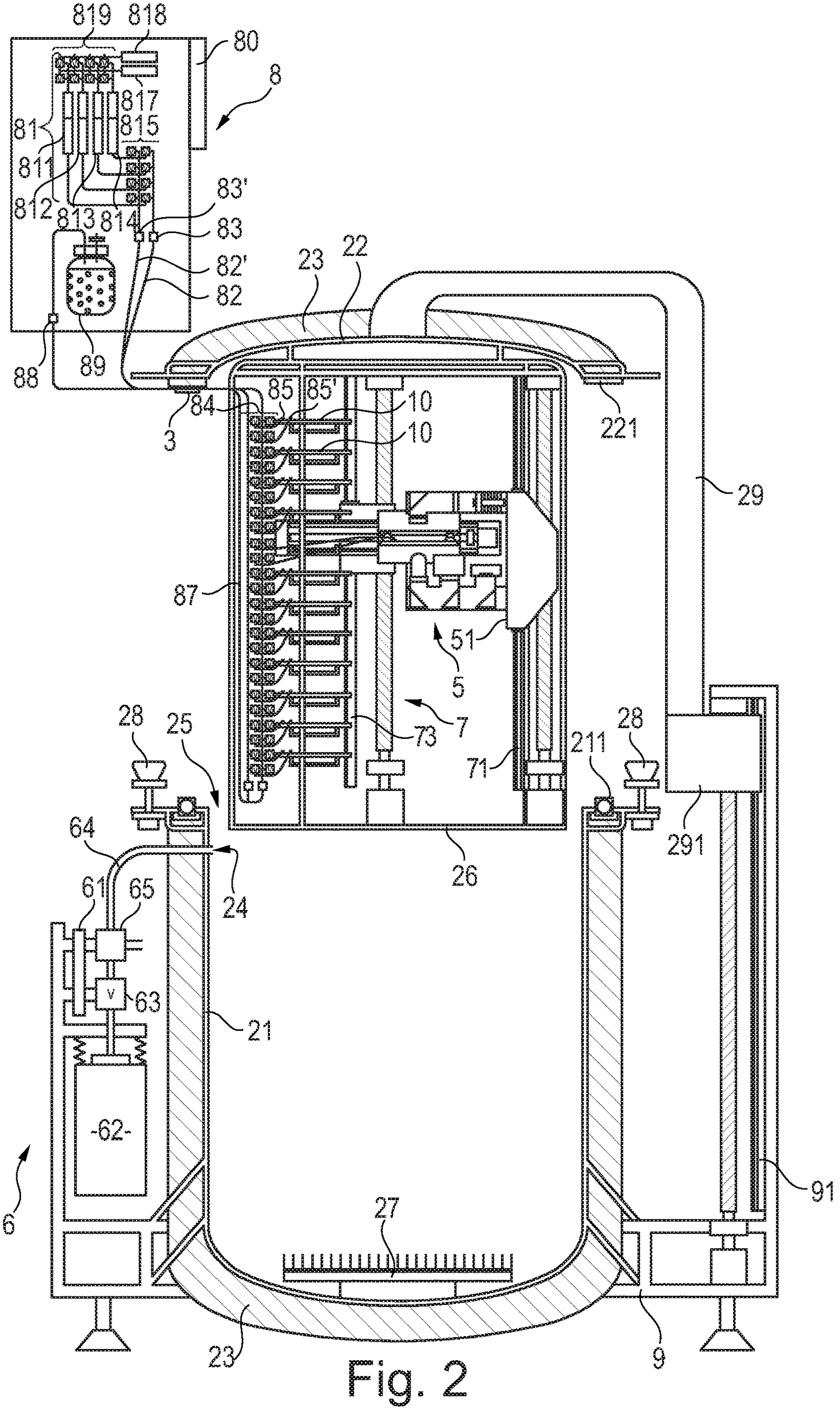
FIG. 2 is a view similar to FIG. 1, in an open configuration of the fluid-tight chamber.
Figure 9B:
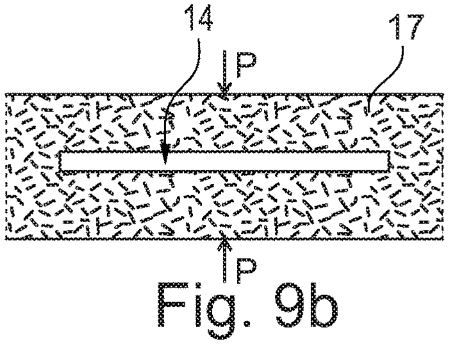

In the example shown in FIGS. 1 and 2, the apparatus 1 comprises a container 2 formed by the combination of a main body 21 and a cover 22. In the closed configuration of the container 2 visible in FIG. 1, the main body 21 and the cover 22 define therebetween a fluid-tight chamber 20 having a fluid inlet 24. The chamber 20 is configured to receive in its internal volume a plurality of microfluidic devices 10 to be clamped collectively under the action of the pressure of a clamping fluid present in the chamber. More precisely, the chamber 20 is pressurized with the clamping fluid fed through the fluid inlet 24, and the microfluidic devices 10 present in the chamber 20 are clamped by compression of their deformable parts under the action of the pressure P of the clamping fluid. As illustrated schematically in FIGS. 6*a*-6*b*, 7*a*-7*b*, 8*a*-8*b*, 9*a*-9*b*, the deformable parts are, respectively, the elastomeric seal 13 between the back and cover plates 11, 12 in the examples of FIGS. 6*a*-6*b*, 7*a*-7*b*, 8*a*-8*b*, and the material constituting the monolithic chip in the example of FIGS. 9*a*-9*b*.

According to one implementation of the apparatus 1, the clamping fluid is a gas, such as pressurized air. According to another implementation of the apparatus 1, the clamping fluid is a combination of a heat transfer liquid, for example water or an oil, received in the main body 21 of the container 2 so as to fill partially the internal volume of the chamber 20, e.g. about 80% of its internal volume, the rest of the internal volume of the chamber 20 being filled with pressurized air provided through the fluid inlet 24. As shown in FIGS. 1 and 2, the bottom of the main body 21 is provided with a heat exchanger 27 allowing heating and/or cooling of the clamping fluid when the operations to be realized inside the microfluidic devices 10 requires a specific working temperature.

As clearly visible in FIGS. 1 and 2, the apparatus 1 comprises a frame 9 supporting both the main body 21 and the cover 22 of the container 2, with possibility of displacement of the cover 22 relative to the main body 21 so as to open the chamber 20. In the sealed configuration of the chamber 20 shown in FIG. 1, the cover 22 closes the opening 25 of the main body 21 in a fluid-tight manner relative to the clamping fluid, the interspace between the cover 22 and the main body 21 being sealed by sealing members 3, 211, 221.

The cover 22 is held relative to the main body 21 in the sealed configuration by means of fastening screws 28, which maintain the sealing members 3, 211, 221 in a compressed state. As shown in FIG. 2, upon removal of the fastening screws 28, it is possible to separate the cover 22 from the main body 21, through an upward movement of a lifting arm 29 connected to the cover 22. To guide the movement of the lifting arm 29, the frame 9 advantageously comprises a motorized ball screw actuator and a guiding rail 91 along which a sliding end 291 of the lifting arm 29 can slide upward and downward.

The structure of the main body 21 and the cover 22 of the container 2 is made of sheet metal of appropriate thickness, such as stainless steel, which makes the container 2 robust and capable of withstanding the pressure levels required for the clamping. For each of the main body 21 and the cover 22, the metal armature is lined with heat insulation 23. In addition, the metal armature of the cover 22 forms a rack structure 26 intended to be received in the internal volume of the main body 21 when the cover 22 closes the opening 25 of the main body 21. The rack structure 26 includes support elements 260 on which the microfluidic devices 10 can be placed. The rack structure 26 also provides support for a monitoring system 5 configured to monitor the content of microfluidic devices 10 received in the chamber 20, and for a displacement system 7 configured to displace an imaging head 51 of the monitoring system 5 and the microfluidic devices 10 relative to one another in the chamber 20.

In the example shown in the figures, the monitoring system 5 comprises an imaging head 51 including both a phase imaging system and a fluorescence imaging system. More specifically, as best seen in the enlarged view of FIG. 16, the imaging head 51 comprises a U-shaped structure, wherein a first arm of the U carries a phase contrast light source 52 while the second arm of the U carries an imaging arm 54 and a fluorescence imaging module 56. The phase contrast light source 52 includes: an electroluminescent diode (LED) 521; a collimation lens 522; a mirror 523 positioned at 45° to the light path; a phase annulus 524; and a condenser 525. Facing the phase contrast light source 52, the imaging arm 54 includes: a multipurpose objective 541 suitable for both phase imaging and fluorescence microscopy; a lens 542; two mirrors 543 and 544 positioned at 45° to the light path; and a camera 545. The fluorescence imaging module 56 is inserted in the imaging arm 54 and includes: an excitation light source 561, e.g. a laser; a divergent lens 562; and a dichroic mirror 563 positioned at 45° to the light path, said dichroic mirror 563 being configured to reflect the light of the excitation light source 561, while transmitting the other wavelengths.

To produce phase contrast images of the content of a microfluidic device 10 received in the chamber 20, the microfluidic device 10 is placed in the interspace of the U-shaped imaging head 51, at a working distance from the condenser 525. Then, the LED 521 of the phase contrast light source 52 is turned on, its light is collimated by the lens 522, reflected by the mirror 523, spatially filtered by the phase annulus 524, and condensed by the condenser 525 toward the microfluidic device 10. The light is transmitted by the microfluidic device 10 and its content, and a portion of the transmitted light is collected by the objective 541 positioned at a working distance from the microfluidic device 10. The collected light is collimated by the objective 541 and converged by the lens 542 to form a picture on the sensor plane of the camera 545, after reflections on the two mirrors 543 and 544 and passage through the dichroic mirror 563.

To produce fluorescence images of the content of a microfluidic device 10 received in the chamber 20, the fluorescence light source 561 is turned on, its beam is expanded by the divergent lens 562, redirected by the dichroic mirror 563 and the mirror 543, and collimated by the lens 542 before being focused by the objective 541 in the microfluidic device 10 in the focal plane. Light emitted from the illuminated area by fluorescence is partially collected by the objective 541, collimated and converged by the lens 542 to form a picture on the sensor plane of the camera 545, after reflections on the two mirrors 543 and 544 and passage through the dichroic mirror 563.

To adjust the relative positions of the imaging head 51 and a microfluidic device 10 to be monitored in the chamber 20, the apparatus 1 comprises a displacement system 7 including several motorized ball screw actuators and associated guiding rails, i.e.: a first guiding rail 71 mounted substantially vertically on the rack structure 26, along which the imaging head 51 can slide upward and downward; a second guiding rail 73 also mounted substantially vertically on the rack structure 26, along which a slider 74 can slide upward and downward; and a third guiding rail 75 mounted substantially horizontally on the slider 74, along which a gripping head 76 can slide sideways. Of course, the displacement system 7 may also comprise additional displacement means, notably allowing movements out of the plane of FIGS. 1, 2, 16, so that the imaging head 51 can be moved opposite most of the surface of the microfluidic device 10. For the sake of clarity, such transversal displacement means are not shown in the figures. In a variant (not illustrated), the displacement system 7 may also be a robotized arm configured to move the imaging head 51 around the microfluidic device 10.

The gripping head 76 is configured to grip, by means of suction cups 78, a microfluidic device 10 initially positioned on a support element 260 of the rack structure 26, and displace it toward the interspace of the U-shaped imaging head 51 by sliding along the guiding rails 73 and 75. Additionally, the imaging head 51 is configured to move vertically relative to a microfluidic device 10 positioned in its interspace, by sliding along the guiding rail 71, to adjust the objects to be imaged in the focal plane of the objective 541. To perform high quality phase contrast imaging, the distance between the phase contrast light source 52 and the imaging arm 54 is adjusted according to the thickness and refractive properties of the microfluidic device 10 and its content.

Of course, more sophisticated imaging devices, e.g. comprising multiple excitation light sources, ultra-short impulsion light sources, other types of wavelength filters and/or confocal capabilities, may also be used as a monitoring system 5 mounted in the chamber 20, as well as other types of active systems for applying specific solicitations to the content of a microfluidic device 10 received in the chamber 20.

The frame 9 also supports other parts of the apparatus 1 including a clamping fluid management system 6 and a perfusion fluid management system 8. The clamping fluid management system 6 is configured to adjust the pressure of the clamping fluid in the chamber 20 with a pressure source, whereas the perfusion fluid management system 8 is configured to adjust the pressure of a perfusion fluid in each microfluidic device 10 present in the chamber 20 with another pressure source. For the clamping of a microfluidic device 10, the pressure of the clamping fluid in the chamber 20 is strictly higher than the pressure of the perfusion fluid in the microfluidic device 10. This operational condition may be automatically controlled by a control unit, which can include several control modules such as the control modules 61, 80 described below. Typically, the difference between the pressure of the clamping fluid in the chamber 20 and the pressure of the perfusion fluid in the microfluidic device 10 is kept equal to or higher than 0.05 bar, preferably equal to or higher than 0.1 bar.

In the example shown in the figures, the clamping fluid management system 6 comprises a pressure source 62—here, a pump—connected to the fluid inlet 24 of the chamber 20 via a duct 64. A valve 63 and a pressure sensor 65 having an air intake 66 are located in the duct 64 in order to, respectively, regulate the flow of the clamping fluid at the output of the pressure source 62 and measure the pressure of the clamping fluid provided in the chamber 20. A control module 61 is configured to ensure that the pressure of the clamping fluid enables pressurization of the chamber 20 such that a pressure difference between the internal volume of the chamber and the outside of the chamber is at least 0.5 bar, preferably at least 1 bar, more preferably at least 3 bar.

In the example shown in the figures, the perfusion fluid management system 8 comprises: a reactant module 81 including a plurality of reactant tanks 811-814 and an array of valves 815 at the outlets of the reactant tanks, the inlets of the reactant tanks being connected to two electronic pressure controllers 817, 818 via an array of valves 819; two perfusion lines 82, 82' each provided with a pressure sensor 83, 83', where the array of valves 815 is configured to establish a connection between one or more of the reactant tanks 811-814 and the perfusion lines 82, 82'; an array of valves 84 configured to establish a connection between at least one of the perfusion lines 82, 82' and at least one microfluidic device 10 positioned in the chamber 20, each microfluidic device 10 being fed through a pair of feeding lines 85, 85' connecting the perfusion lines 82, 82' respectively to the inlet port 15 and to the outlet port 16 of the microfluidic device; a purge line 87 to which the perfusion lines 82, 82' are connected via a respective valve 86, 86', the purge line 87 being provided with a pressure sensor 88; a waste tank 89. The perfusion fluid management system 8 also comprises a control module 80 controlling the pressure controllers 817, 818 and the valves 819, 815, 84, 86, 86', so as to regulate the pressure of the perfusion fluid distributed in each microfluidic device 10.

The structure of the reactant module 81, where a plurality of reactant tanks 811-814 are coupled to the pressure controllers 817, 818 via the valve array 819, makes it possible to reduce the number of pressure controllers 817, 818 to the number of perfusion lines, i.e. two perfusion lines 82, 82' in the illustrated example. The presence of two perfusion lines 82, 82' is advantageous in that it allows one line to be used for the input of the microfluidic devices 10 and the other line to be used for the output of microfluidic devices 10, being connected to the reactant tanks 811-814 via the valve array 815 which allows any configuration of connection between the perfusion lines 82, 82' and the reactant tanks 811-814. The use of pressure controllers 817, 818 to regulate the pressure of the perfusion fluid in each microfluidic device 10, rather than volumetric pumps or other flow generators, ensures that the flow of the perfusion fluid is stable and improves the control of the pressure of the perfusion fluid in each microfluidic device, which is key for the clamping. In particular, electronic pressure controllers, which are pressure generators controlled with an electronic feedback loop, allow better instantaneous control of the pressure of the perfusion fluid.

The embodiment of the perfusion fluid management system 8 shown in the figures allows for a very flexible use of the reactant tanks to perfuse microfluidic devices, for example the output of a microfluidic device may be collected in one of the reactant tanks and used to perfuse another microfluidic device at a later stage. The number of perfusion lines may be increased when complex operations with reduced mixing and cross-contamination between consecutive flows are required, making it possible to physically separate the input and output flows having different functions in different perfusion lines. The individual connection of each microfluidic device 10 to the perfusion lines 82, 82' via the array of valves 84 is also advantageous in that it allows any combination of the connections, resulting in high operational flexibility.

Preferably, the perfusion lines 82, 82' are connected at one end to the reactant tanks 811-814 via the valve array 815 and at the other end to a purge line 87 via electronically controlled valves 86, 86', the purge line 87 being connected to a waste tank 89 of relatively large volume. The electronically-controlled valves 86, 86' connecting the perfusion lines 82, 82' to the purge line 87 may be doubled with one-way check valves in order to avoid back-flow. This configuration allows for a complete flushing of the perfusion lines 82, 82' in order, for example, to efficiently reduce cross-contamination and mixing between solutions handled in a same perfusion line at successive times and with opposite flow directions. The pressure control system preferably comprises a pressure sensor 83, 83' in each perfusion line 82, 82' and a pressure sensor 88 in the purge line 87, all pressure sensors being connected to the control module 80 of the system 8 with a feedback loop actively controlling that the perfusion pressure is kept under a predefined threshold value to avoid that the pressure of the perfusion fluid in each microfluidic device 10 becomes higher than the pressure of the clamping fluid in the chamber 20 and generates leaks.

In this first embodiment, the chamber 20 receives only part of the perfusion fluid management system 8 in its internal volume. The reactant module 81, the waste tank 89, and part of the perfusion lines 82, 82' and the purge line 87 with their associated pressure sensors 83, 83', 88, are located outside the chamber 20. To allow fluid-tight passage of the perfusion lines 82, 82' and the purge line 87 through the wall of the chamber 20, a sealing member 3, which is one of the sealing members for sealing the interspace between the cover 22 and the main body 21, is provided with three holes 33 intended to receive tubes of the perfusion lines 82, 82' and the purge line 87. As clearly visible in the cross section of FIG. 12, each hole 33 extends between an inner end 32 of the sealing member 3 intended to be directed toward the inner volume of the chamber 20 and an outer end 31 of the sealing member 3 intended to be directed toward the exterior of the chamber 20. The sealing member 3 advantageously has a frustoconical shape as shown in FIG. 12, with the inner end 32 of the sealing member 3 having a larger surface area than the outer end 31, so that the pressure P of the clamping fluid in the chamber 20 during a clamping operation pushes the sealing member 3 toward the exterior, thus enhancing the sealing at the level of the inclined peripheral wall 35 of the trapezoidal sealing member.

As shown in the larger scale views of FIGS. 10 and 11, in the sealed configuration of the chamber 20, the sealing member 3 is inserted between an inflatable 0-ring 211, provided in a groove 210 of the main body 21, and a flat gasket 221 fastened to the cover 22. The inflatable O-ring 211, which may be replaced by any other seal with very high deformability, is well-suited to sustain the deformation induced by the height of the sealing member 3 in the closed configuration of the container 2. The sealing member 3 is advantageously overmolded around tubes of the perfusion lines 82, 82' and the purge line 87, and fastened to the flat gasket 221, so that in the open configuration of the cover 22, the microfluidic devices 10 can be placed on the support elements 260 of the rack structure 26 with the fluidic connections already established with the perfusion fluid management system 8. This arrangement makes it possible to handle operations requiring sterility and not allowing any intermittent disconnections of the components of the system 8. In order to install the microfluidic devices 10 and the components of the system 8 without disconnections, the valves 819, 815, 84, 86, 86' are configured to receive a tube to be operated to block the flow of the perfusion fluid. For example, all valves may be pinch valves, or else thermal valves operating by locally freezing the perfusion fluid in the channels or tubes when the material thereof is not compatible with reversible pinching.

In the variant shown in FIGS. 13 to 15, the sealing member 3', instead of being overmolded around tubes of the perfusion lines 82, 82' and the purge line 87, is openable by reversible deformation. More precisely, the sealing member 3' comprises three slots 34' extending from the holes 33', so as to give access to the holes 33' in the open configuration of the slots 34', whereas the holes 33' are fluid-tightly closed around tubes of the perfusion lines 82, 82' and the purge line 87 when the sealing member 3' is in a sealing configuration in the interspace between the cover 22 and the main body 21. In this variant, the sealing member 3' is fastened in a groove 220 of the cover 22, so that in the open configuration of the cover 22, the microfluidic devices 10 can be placed on the support elements 260 of the rack structure 26 and the tubes of the perfusion lines 82, 82' and the purge line 87 can be inserted in the holes 33' of the sealing members 3' via the slots 34'. In the sealed configuration of the chamber 20, the sealing member 3' cooperates with a flat gasket 212 fastened to the main body 21.

A method for clamping a plurality of microfluidic devices 10 by means of the apparatus 1 comprises steps as described below.

First, in the open configuration of the container 2 shown in FIG. 2, each one of the plurality of microfluidic devices 10 "pre-clamped" with an adhesive tape 18 is positioned on a support element 260 of the track structure 26 and is connected to the perfusion fluid management system 8, via the perfusion lines 82, 82' and the purge line 87 passing in the holes 33 or 33' of the sealing member 3 or 3'. Interconnection tubes are connected in a working position to the valves 819, 815, 84, 86, 86, which may be in particular pinch valves or thermal valves.

Then, the chamber 20 is sealed so as to be fluid-tight to the clamping fluid, by displacing the cover 22 until it applies against the main body 21 and seals the loading opening 25. In this position, the fastening screws 28 are tightened so as to pressurize the sealing members 3, 211, 221. The inflatable O-ring 211 is pressurized at this stage. The displacement of the cover 22 is advantageously obtained automatically by sliding of the sliding end 291 of the lifting arm 29 downward along the guiding rail 91.

Once the chamber 20 has been sealed, the clamping fluid is fed into the chamber 20 from the clamping fluid management system 6 so as to collectively clamp the microfluidic devices 10 by compression of their elastomeric seal 13 under the action of the pressure of the clamping fluid in the chamber 20. To this end, the clamping fluid is fed through the fluid inlet 24 until a desired pressure of the clamping fluid is reached in the chamber 20 which is strictly higher than the pressure of the perfusion fluid in each of the microfluidic devices 10.

In one embodiment, the pressure of the clamping fluid in the chamber 20 and the pressure of the perfusion fluid in the microfluidic devices 10 can be controlled by a control unit including both the control module 61 of the clamping fluid management system 6 and the control module 80 of the perfusion fluid management system 8. In one embodiment, this control unit is configured to receive measurements of the pressure of the clamping fluid in the chamber 20 from the pressure sensor 65 and of the pressure of the perfusion fluid in the microfluidic devices 10 from the pressure sensors 83, 83', and to drive both the clamping fluid management system 6 and the perfusion fluid management system 8 as a function of the received pressure measurements.

In the second embodiment shown in FIGS. 17 and 18, elements similar to those of the first embodiment bear identical references. The clamping apparatus 1 of the second embodiment differs from the first embodiment in that the fluid-tight passage of the perfusion lines 82, 82' and the purge line 87 through the wall of the chamber 20 is realized through a connecting unit 4 specially positioned in correspondence with holes provided for this purpose in the envelope of the container 2, instead of being realized through a sealing member configured to seal the interspace between the cover 22 and the main body 21 as in the first embodiment. The connecting unit 4 includes a casing 41, around which a sealing resin may be cast, and three fluid passages 42 extending through the wall of the chamber 20. Each passage 42 is provided at its ends with connectors 43 and 45, respectively intended for the connection, on the side directed toward the inner volume of the chamber 20, of a tube of the perfusion lines 82, 82' or purge line 87 connected to the microfluidic devices 10 and, on the side directed toward the exterior of the chamber 20, of a tube of the perfusion lines 82, 82' or purge line 87 connected to the perfusion fluid management system 8. In this embodiment, the inner wall of the fluid passages 42 is preferably made of a material which can be cleaned and sterilized easily, such as polytetrafluoroethylene (PTFE), glass, stainless steel.

In the third embodiment shown in FIG. 19, elements similar to those of the first embodiment bear identical references. The clamping apparatus 1 of the third embodiment differs from the first embodiment in that the entirety of the perfusion fluid management system 8 is received in the internal volume of the chamber 20, i.e. including the reactant module 81, the waste tank 89, and all of the perfusion lines 82, 82' and the purge line 87 with their associated pressure sensors 83, 83', 88. In this third embodiment, the tubes connecting the microfluidic devices 10 with the perfusion fluid management system 8 are sufficiently rigid so as to withstand the pressure of the clamping fluid in the chamber 20 substantially without deformation. In this way, the circulation of the perfusion fluid between the perfusion fluid management system 8 and the microfluidic devices 10 is not impacted by the pressurization of the chamber 20 with the clamping fluid during a clamping operation. By way of example, small diameter silicone tubes, e.g. having an internal diameter of the order of 0.8 mm and an outer diameter of the order of 2.4 mm, are sufficiently rigid not to excessively deform in operating conditions such as a pressure of the clamping fluid of between 0 and 3 bar. In this third embodiment, the waste tank 89 is connected to a pressure controller or a pressure generator, which differs from the previous embodiments where the waste tank 89 is simply vented, e.g. through a filter. The connection to a pressure controller or a pressure generator is required to avoid that the pressure of the perfusion fluid in the waste tank 89 equals that of the clamping fluid in the chamber 20, which would prevent purge operations and may induce backflow.

The invention is not limited to the examples described and shown.

In particular, any type of microfluidic device, especially with no elastomeric part, may be clamped in an apparatus according to the invention, and each microfluidic device may be a stack of microfluidic chips instead of one microfluidic chip as in the examples described above.

A microfluidic device to be clamped in an apparatus according to the invention may also comprise active elements, such as internal valves, electrodes, sonotrodes, light sources. A microfluidic device to be clamped in an apparatus according to the invention may also comprise sensors. A microfluidic device to be clamped in an apparatus according to the invention may also comprise embedded electronics.

In addition, the clamping fluid may be a gas, a liquid, or a combination of both. The molecular composition of the clamping fluid may also be modified. In particular, in the case of a clamping fluid being a mixture of gases, the percentage of each gas in the gas mixture may be monitored and controlled. For example, in embodiments in which living cells are processed, a control of the concentrations of $CO_2$, $O_2$, $N_2$ may be of interest in cases where convective and/or diffusive gas molecule exchanges occur between the clamping fluid and the channels of the microfluid device.

As mentioned previously, active systems other than the imaging system described above may be used inside the pressurized chamber during a clamping operation of a microfluidic device. In particular, the apparatus of the invention may comprise any other type of monitoring system, such as a temperature monitoring system, a calorimetric measurement system, an electromagnetic impedance measurement system, or any system configured to apply a solicitation to the content of a microfluidic device.

Any means for conveying tubes in a fluid-tight manner may also be used in the case where the perfusion fluid management system is outside the chamber, especially other than those exemplified above. In addition, the perfusion fluid management system may allow switching between several perfusion modes for perfusing the or each microfluidic device. For example, a microfluidic device comprising alternative fluidic circuits and more than two ports may be perfused according to the alternative fluidic circuits using valves configured to connect selected ports to selected flow lines.

The invention claimed is:

1. An apparatus for clamping at least one microfluidic device, said apparatus comprising:

a fluid-tight chamber having a fluid inlet, the chamber being configured to receive a microfluidic device to be clamped by compression of at least one deformable part of the microfluidic device under the action of a pressure of a clamping fluid in the chamber, a perfusion fluid management system configured to adjust the pressure of a perfusion fluid in the microfluidic device in such a way that, during a clamping operation, the pressure of the clamping fluid in the chamber is strictly higher than the pressure of the perfusion fluid in the microfluidic device, wherein the perfusion fluid management system comprises at least one pressure controller, a clamping fluid management system configured to adjust the pressure of the clamping fluid in the chamber, the clamping fluid management system comprising a pressure source connected to the fluid inlet of the chamber via a duct, and a control unit configured to drive both the clamping fluid management system and the perfusion fluid management system in such a way that, during a clamping operation, the pressure of the clamping fluid in the chamber is strictly higher than the pressure of the perfusion fluid in the microfluidic device.

2. The apparatus according to claim 1, wherein the chamber is configured to receive in its internal volume a plurality of microfluidic devices to be clamped collectively under the action of the pressure of the clamping fluid in the chamber.

3. The apparatus according to claim 1, comprising at least one active system configured to monitor the content of a microfluidic device received in the chamber and/or to apply a solicitation to the content of a microfluidic device received in the chamber during a clamping operation, through at least one wall of the microfluidic device.

4. The apparatus according to claim 3, comprising a displacement system for displacing the active system and a microfluidic device received in the chamber relative to one another, so as to position the active system in the vicinity of channels of the microfluidic device during a clamping operation.

5. The apparatus according to claim 3, comprising a monitoring system configured to monitor the content of a microfluidic device received in the chamber during a clamping operation, and a control module configured to drive the perfusion fluid management system as a function of measurements of the monitoring system.

6. The apparatus according to claim 1, wherein the chamber comprises a loading opening for loading the microfluidic device in and out of the chamber, the loading opening being fluid-tightly closed during a clamping operation.

7. The apparatus according to claim 1, wherein the chamber is configured to receive only part of the perfusion fluid management system in its internal volume, the apparatus comprising at least one sleeve configured to be positioned in an opening of a wall of the chamber during a clamping operation so as to allow fluid-tight passage of at least one tube connecting the microfluidic device with the perfusion fluid management system.

8. The apparatus according to claim 7, wherein the sleeve comprises at least one hole configured to receive a tube connecting the microfluidic device with the perfusion fluid management system, the hole extending between an inner end of the sleeve intended to be directed toward the inner volume of the chamber and an outer end of the sleeve intended to be directed toward the exterior of the chamber, the hole being fluid-tightly closed around the tube.

9. The apparatus according to claim 1, wherein the chamber is configured to receive only part of the perfusion fluid management system in its internal volume, the apparatus comprising a connecting unit in a wall of the chamber including at least one fluid passage extending through the wall of the chamber and connectors at both ends of the fluid passage for connection, on the side directed toward the inner volume of the chamber, of a tube connected to the microfluidic device and, on the side directed toward the exterior of the chamber, of a tube connected to the perfusion fluid management system.

10. The apparatus according to claim 1, comprising at least one support in the chamber configured to receive a microfluidic device to be clamped.

11. A method for clamping at least one microfluidic device comprising at least one deformable part, said method comprising steps in which:

the microfluidic device is connected to a perfusion fluid management system and positioned in a chamber having a fluid inlet;

the chamber is sealed so as to be fluid-tight to a clamping fluid;

the chamber is pressurized with the clamping fluid fed through the fluid inlet; and the microfluidic device is clamped by compression of the at least one deformable part of the microfluidic device under the action of a pressure of the clamping fluid in the chamber, by applying a pressure of the clamping fluid in the chamber strictly higher than the pressure of the perfusion fluid in the microfluidic device.

12. The method according to claim 11, wherein the pressure of the perfusion fluid in the microfluidic device is controlled by a control module configured to receive measurements from a monitoring system monitoring the content of the microfluidic device during a clamping operation and to drive the perfusion fluid management system as a function of the received measurements.

13. The method according to claim 11, wherein a plurality of microfluidic devices are positioned in the chamber and clamped collectively under the action of the pressure of the clamping fluid in the chamber, by applying a pressure of the clamping fluid in the chamber strictly higher than the pressure of the perfusion fluid in each of the microfluidic devices.

* * * * *